(12) United States Patent
Callahan et al.

(10) Patent No.: US 6,527,208 B1
(45) Date of Patent: Mar. 4, 2003

(54) PROCESS AND APPARATUS FOR RECLAIMING THE ECONOMIC COMPONENTS OF POLLUTED SCRAP RUBBER TIRES

(76) Inventors: John J. Callahan, 356 Grys Ct., Portsmouth, RI (US) 02871; Richard N. Hyland, 50 Winthrop Rd., E. Greenwich, RI (US) 02818; Kevin J. Kelly, 354 Old Boston Neck Rd., #3, Kingstown, RI (US) 02874

( * ) Notice: Subject to any disclaimer, the term of this patent is extended or adjusted under 35 U.S.C. 154(b) by 312 days.

(21) Appl. No.: 09/711,397

(22) Filed: Nov. 14, 2000

(51) Int. Cl.[7] .............................................. B02C 19/00
(52) U.S. Cl. ................. 241/24.11; 241/24.12; 241/24.14; 241/24.17; 241/24.25; 241/24.27; 241/41; 241/76; 241/77
(58) Field of Search .......................... 241/24.11, 24.12, 241/24.14, 24.17, 24.25, 24.27, 27, 41, 42, 76, 77, 79, 79.1, 152.1, 152.2, DIG. 38

(56) References Cited

U.S. PATENT DOCUMENTS

| | | | | |
|---|---|---|---|---|
| 4,025,990 A | * | 5/1977 | Lovette, Jr. ................. 241/14 |
| 4,757,949 A | * | 7/1988 | Horton ........................ 241/38 |
| 4,925,113 A | * | 5/1990 | Wissman et al. ........ 241/101.4 |
| 5,115,983 A | * | 5/1992 | Rutherford, Sr. .............. 241/1 |
| 5,328,104 A | * | 7/1994 | Lima et al. ................. 264/571 |
| 5,527,409 A | * | 6/1996 | Lanphier ...................... 156/71 |
| 5,634,599 A | * | 6/1997 | Khais et al. .................. 241/23 |
| 5,683,038 A | * | 11/1997 | Shinal ............................ 241/1 |
| 5,735,471 A | * | 4/1998 | Muro .......................... 241/23 |
| 5,794,861 A | * | 8/1998 | Rutherford, Sr. .............. 241/1 |

* cited by examiner

*Primary Examiner*—William Hong
(74) *Attorney, Agent, or Firm*—Cristina M. Offenberg

(57) ABSTRACT

A process, and associated apparatus, that separates the economic components of scrapped rubber tires while isolating and removing certain levels of contamination associated with these tires. The separation of the scrap tires contaminants is accomplished by shredding, washing, and rasping the tire product. The continual laboratory testing of the waste wash water and removal of the contaminates and particulates will produce an end-product of 3 to 100 mesh/crumb which will be virtually without contamination. The quality of the end-product is further enhanced by the associated quality apparatus that removes the steel and fiber products in addition to any contaminants.

20 Claims, 4 Drawing Sheets

PROCESS AND APPARATUS FOR RECLAIMING THE ECONOMIC COMPONENTS OF POLLUTED SCRAP RUBBER TIRES

BACKGROUND OF THE INVENTION

1. Field of the Invention

The present invention relates to recycling polluted scrap rubber tires previously stored in such places as stockpiles, landfills or dumps, and more particularly, to a process and apparatus for cleaning and reclaiming the reusable economic components thereof.

2. Description of the Prior Art

Some of the prior art methods which teach a process for comminution of scrap rubber tires require cryogenic treatment. Rubber tires are resilient and thus pose a difficulty in comminuting scrap rubber tires to smaller components. By freezing the tires, the rubber becomes brittle, allowing the tires to be crushed and separated. Such methods are described in U.S. Pat. No. 4,025,990 issued May 31, 1977 to Lovette, Jr; U.S. Pat. No. 4,240,587 issued Dec. 23, 1980 to Letsch; and U.S. Pat. No. 4,342,647 issued Aug. 3, 1982, to McMillian et al. Such systems are inherently expensive since the tires must be frozen and then removed of the ice and water.

There are other processes known to separate the economic components of scrap rubber tires. One such process is by a using a magnetic screen to separate the metallic portions and an airstream is used to separate the fabric fibers leaving behind the rubber component described in U.S. Pat. No. 5,120,767 issued Jun. 9, 1992 to Allard et al. The patents of Rouse et al. U.S. Pat. Nos. 4,560,112 and 4,714,201 teach methods of comminuting scrap metal tire into smaller pieces.

In the patent of Yen et al., there is an apparatus for waste tire treating in which the tires are grinded, washed, dried, granulated, heated, melted, and finally separating the molten rubber from the steel. The Yen apparatus is aimed at recovering the steel by-product from the waste tires while not polluting the environment by baking and heating the tire material in a closed furnace. The Yen patent does not address the problems associated with waste wash water from the waste tires as it will contain the pollutants that were in or on the tires. Additionally, the washing device is comprised of strong sprinklers which may not be economically efficient to clean the tires which have been stockpiled.

In the present invention, no heat is used, ensuring the input material will not produce toxic gas so the harmful elements in the input material cannot be released into the surrounding environment. The present invention is a contained system in which the all the waste products are laboratory tested and are properly disposed of according to the Environmental Protection Agency's regulations.

These prior known processes do not address the problem of cleaning tires that are polluted from being stored in stockpiles, landfills or dumps. The prior art methods and apparatus describe ways to recycle tires which are used but do not teach a way to recycle tires which are dirty and contaminated from being stockpiled.

SUMMARY OF THE INVENTION

The subject invention is designed to handle any type of stockpiled polluted tire, which could include, but not limited to, landfills, dumps, super fund sites, hazardous waste sites or any other known type of sites. The disposal and by-product process will be able to take whole tires as well as shredded tires from existing stockpiles, landfills, and dumps.

For the most part, stockpiles were created over the years by tires being legally and illegally dumped at these sites and never removed due to limited by-product need and to high removal costs. To show the actual cost factor associated with these stockpiles, you need only to look at the present typical tipping fees associated with "dumping" of used tires.

It is an object of the present invention to provide a method and apparatus for reclaiming such polluted scrap tire components in an economically feasible manner while eliminating environmental hazards.

The invention will allow polluted tires from existing stockpiles, landfills and dumps to be properly and safely reclaimed into useable components of steel, fiber and crumb and mesh particles.

A further object of the invention is for safe and proper disposal of all stockpile tires regardless of the condition including removal of any non-acceptable levels of hydrocarbons and other contaminants by the present invention process.

It is a further object of the present invention to provide an improved process designed to process one million to five million tires annually or 3,800 to 19,000 tires daily.

To address the problem of surplus waste tires, the object of this invention is to process polluted scrap tires into clean, usable rubber material. The process and apparatus incorporates several washing and treating components, grinding devices, shredders, steel removal devices and testing stations to process the input material and ensure a clean, finished quality end product. All external sediment is removed from the material, collected, treated and disposed of safely and properly. No heat is used, ensuring the input material will not decompose or break down, and harmful elements in the input material will not be released into the surrounding environment. Laboratory testing of sediment will provide feedback on contaminants at specific supply sites and allow appropriate disposal of particulates and contaminated water.

BRIEF DESCRIPTION OF THE DRAWINGS

Having generally described the nature of the invention, reference is made to the drawings, showing by way of illustration, a preferred embodiment of the invention, in which.

DETAILED DESCRIPTION OF THE PREFERRED EMBODIMENT

Figure 1:
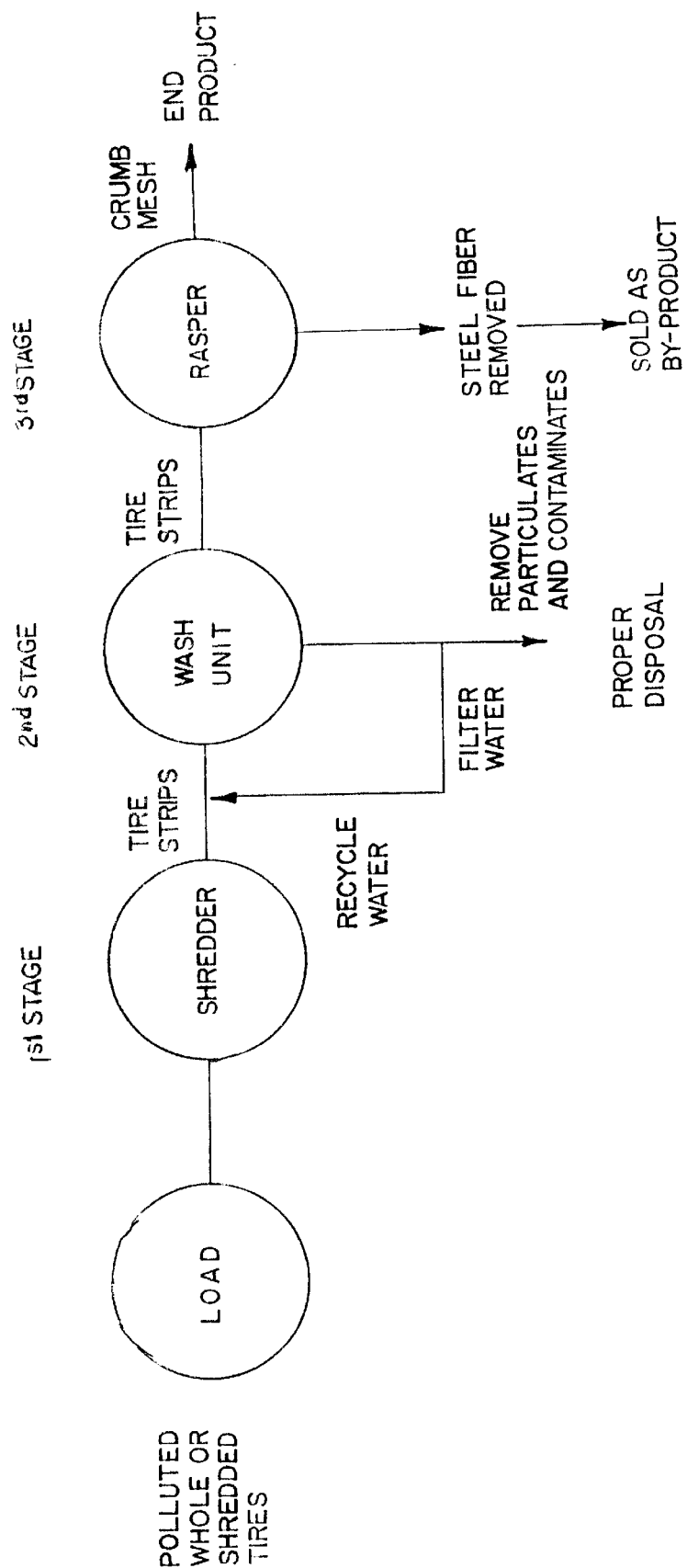
FIG. 1 is a flow sheet of the preferred embodiment of the process of the present invention.
Figure 2A:
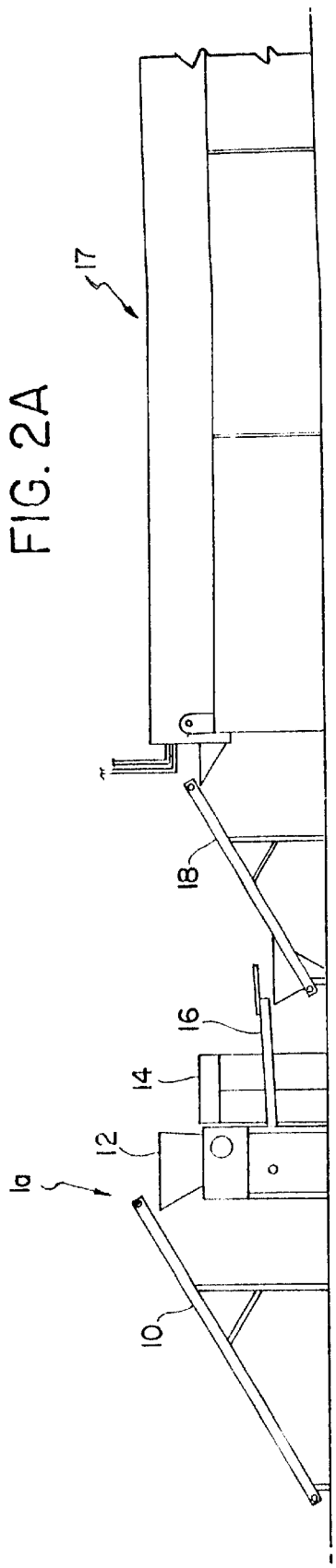
FIGS. 2A and 2B is a schematic illustration of the preferred embodiment of the apparatus in accordance with the present invention for conducting the process in accordance with the present invention.
Figure 2B:
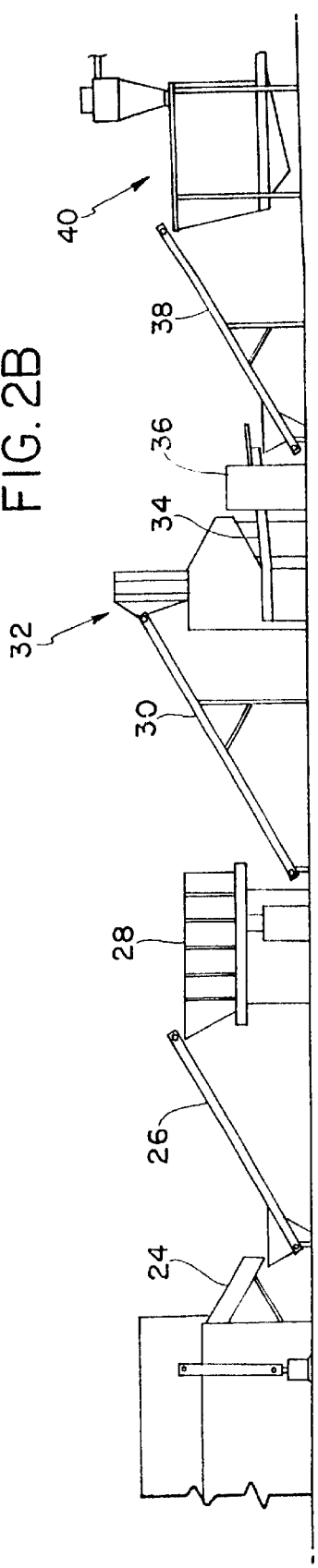

Please refer to FIGS. 1 and 2. The process and apparatus for reclaiming the economic components of polluted scrap rubber tires of the present invention includes used tires processed in part or as a whole either at the material supply size, or at the processing and cleaning facility. The process in accordance with the present invention consists of the steps of comminuting the rubber tires, washing and drying scrap tires using a conveyor system with both a debris removal and a dewatering system. The process may utilize either some or all of the following elements: a) a shredder to reduce the size of the tire to tire strips; b) a conveyor system to feed and control the input material through the cleaning and reclaiming process; c) rasper and steel removal units to reduce the mass of the input material and removal of by product steel and fiber; d) washing device to clean tires or reduced tires to safe levels; e) laboratory testing to confirm the reduction of contaminants of waste wash water and solid materials.

The process includes the first stage in which the tires are conveyed by way of an infeed conveyor (10) to a shredder (12) that will reduce all tire material into 8" minus tire strip material or tire product (lower shredded level expected to be no less than 2"). The power unit (14) is shown placed by the shredded (12). An outlet vibrator (16) conveys the tire strips to a second stage.

Figure 3:
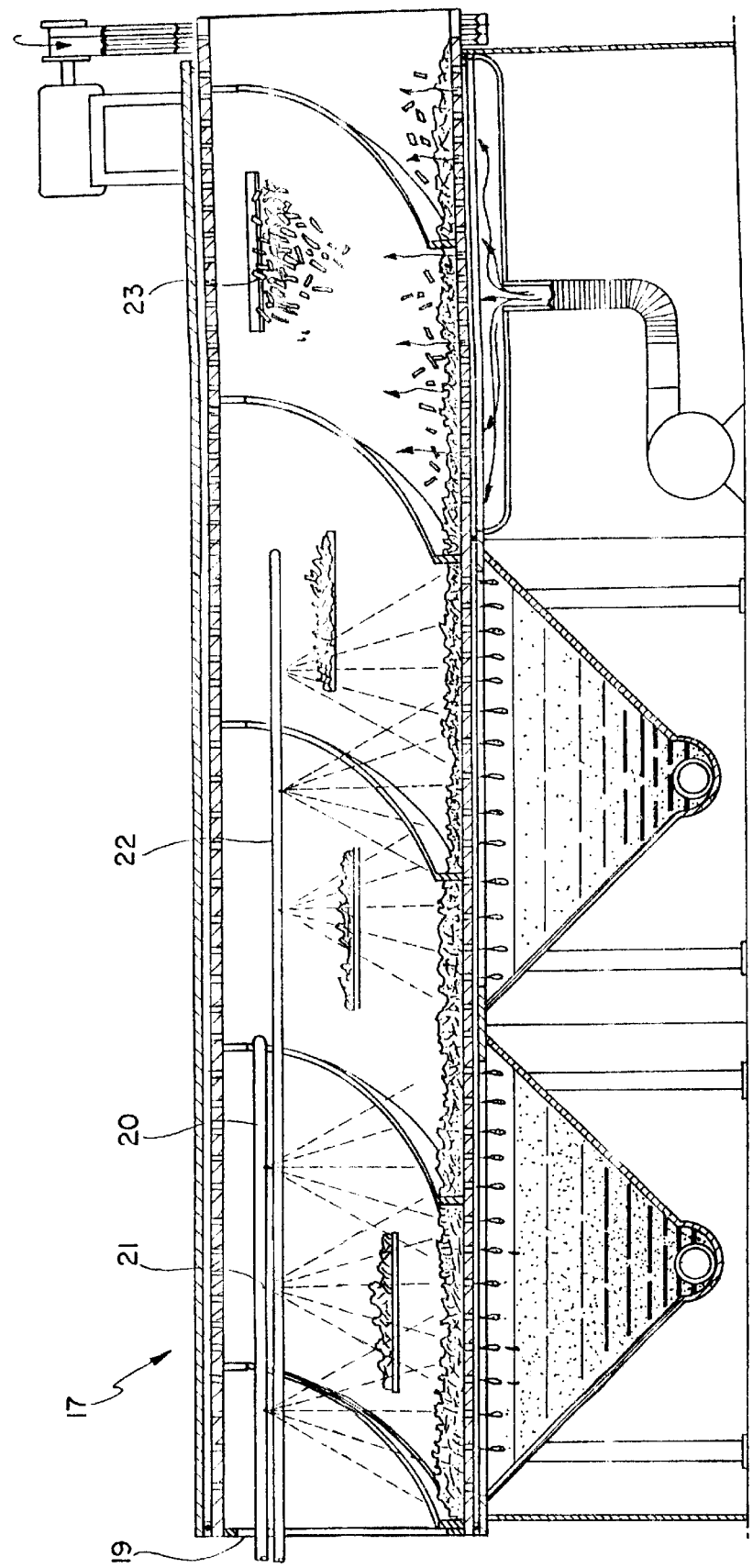
FIG. 3 is an enlarged view of the washing unit of FIGS. 2A and 2B
Figure 4:
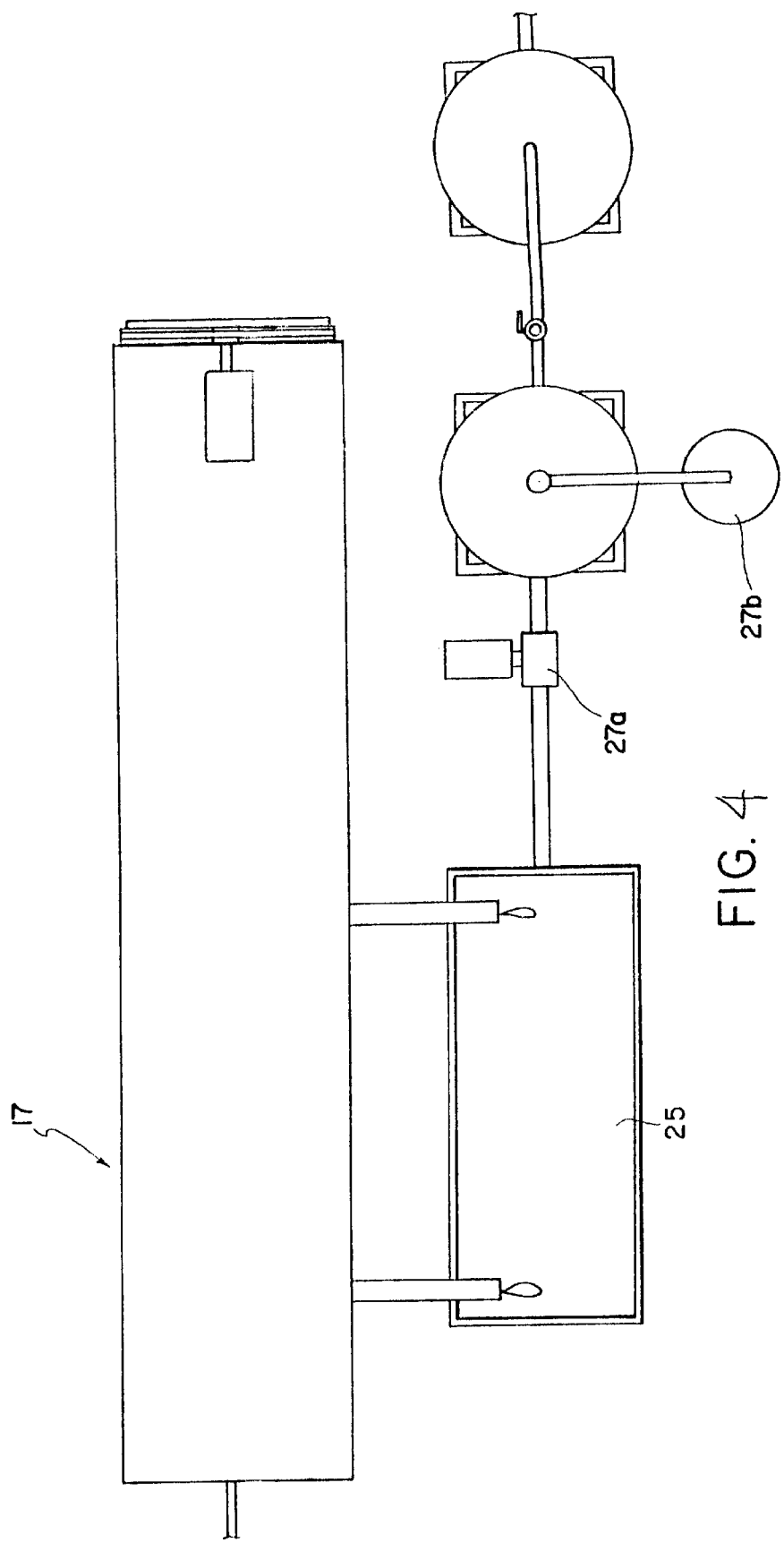
FIG. 4 is an enlarged view of the recycling unit of FIGS. 2A and 2B.

In the second stage, an infeed conveyor (18) takes the tire product to a washing stage with a washing unit (17) that consists of a barrel style drum with an internal auger and flutes to tumble wash the tire product. FIG. 3 illustrates the washing unit (17) in more detail. The input tire product is placed in a rotating drum (19), tumbled and washed by the wash manifold (20) with high impact, hot, soapy water to separate the waste particulates and from the tire product and remove any all debris, such as rocks, dirt and sediment. The rotating drum (19) is perforated with proper sized holes to allow the debris that will be washed from the tire product to be removed from the rotating. Drum (19). There are a plurality of nozzles (21) on the wash manifold (20) that spray hot soapy water over the tire product to wash it clean of debris while at the same time the tire product is tumbling in the rotating drum (19). The tire product is then rinsed by the rinse manifold (22) to remove all the wash water and soap product. The rotating drum (19) will have angle control as well as a rotating speed control so it may maintain the best speed for the amount of the product that will travel through it. At the end of the rotating drum (19), a high volume of warm air (23) is blown through the product to remove all excess water. All debris that is washed from the product will be caught under the washing unit (17) where either a flat conveyor system or an auger will dewater and move any debris and freed particulates up and into a trash collection container to be properly disposed of according to current Environmental Protection Agency standards. FIG. 4 shows the collection tank (25) located beneath the washing unit (17) that collects the wash water, soap product and debris used during the washing stage. The collected water and debris is recycled by means of a DAF (dissolved air flotation) (27a) which separates the water from the collected debris and particulates. The debris and particulates are reclaimed in a reclamation tank (27b) while the water is treated to remove contaminate and then the cleaned water is reused in the washing stage. A water treatment system processes the contaminated water for reuse or discharge. The water filtration system will consist of multi-disk type filters that can be cleaned automatically on a timed basis without being dismantled. it will remove contaminants from the waste wash water down to about 50 microns. The filtered water can then be reused in the drum washing system or sent to the final filtration process where it will be chemically treated for separation and finally processed through an ultra-filtration system. The system will remove all hydrocarbons and other contaminants that would prevent safe discharge of water to water sewer systems or ground water injection. The washed tire product is then conveyed by the discharge sheet (24) from the washing unit (17) to the third stage.

The third stage includes the 8" minus tire strip material being conveyed by way of an infeed conveyor (26) to a buffer silo (28) which holds the material for further processing. The tire product then is transferred by the infeed conveyor (30) to a rasper (32) that further reduces the 8" minus tire strip from the first stage to 2" minus crumb and mesh product (lower shredder material expected to be no less ⅜"). At this point the material may be washed again. The process may continue to further reduce the tire product by conveying it to an outlet vibrator (34) and then underneath an overband magnet (36) which removes the steel and fiber from the tire (which is then used as by-products). The infeed conveyor (38) moves the tire crumb product to a feeding bin (40).

The figures show the preferred embodiment of the process, however, the process can be run by switching the first and second stages so that the tire product is cleaned before the shredding stage. Additionally, the process can also be run by switching second and third stages so that the tire product is cleaned after the rasper stage. Lastly, the process can also be run with more than one washing unit so that the tire product cleaned at more that one stage in the process.

In a further process, the waste wash water and solid materials collected in the reclamation tank are laboratory tested to confirm the reduction of contaminants. This step consists of the extraction of the waste wash water and solid particulates to be sent to a qualified and appropriate chemical and environmental test laboratory for testing. The tests are done to establish all hydrocarbon and other contaminant levels that exist at the end of the filtration system processing. All sampling results will be entered in a database that will detail the actual landfill stack and all over other pertinent non-testing information. A database will be created to maintain information on specific site locations and the contaminants their input materials contain.

An additional stage can be performed on the crumb tire product. Instead of taking the ⅜" to 2" by-products and selling them directly to by-product buyer, the quality lab acceptable 2" minus by-product is further conveyed to granulators, cracker mills or other appropriate equipment that would reduce the end-product from ⅜" minus to as low as 200 mesh after first sending it through a lab test cycle to verify the quality of the end-product.

It is to be understood that the above description and drawing are only used for illustrating the preferred embodiment of the present invention, not intended to limit the scope. Any variation and derivation from the above-described invention is hereby included in the scope of this invention.

What is claimed is:

1. A process for separating the economic components of scrap rubber tires, including the steps of
   shredding the tires to yield particulate tire strips in a first stage;
   conveying said particulate tire strips to a second stage;
   washing the particulate tire strips in the second stage in a rotating drum unit while separating and retaining the waste wash water, contaminates, and freed particulates in a collection means and then drying said particulate tire strips;
   separating the particulates and contaminates from the waste wash water and properly disposing the particulates and contaminates;

filtering the waste wash water to remove pollutants yielding a processed water;

reusing the processed water in the second stage;

conveying the particulate tire strips to a third stage;

rasping the particulate tire strips yielding varying size crumb and mesh particles in the third stage while separating out steel and fiber materials from the tire strips wherein said steel and fiber are removed and used as a by-product and wherein the crumb and mesh particles are used as end product.

2. A process as defined in claim 1, wherein the second stage includes periodic quality control laboratory testing of the waste wash water after removing the contaminates and particulates.

3. A process as defined in claim 1, including a second washing unit for the tires before the first stage in a rotating drum unit while separating and retaining the waste wash water, contaminates, and freed particulates in a collection means and then drying said washed tire strips.

4. A process as defined in claim 3, including periodic quality control laboratory testing the waste wash water for pollutants before being recycled in the rotating drum unit.

5. A process as defined in claim 1, including washing the crumb and mesh particles after the third stage in a rotating drum unit while separating and retaining the waste wash water, contaminates, and freed particulates in a collection means and then drying said washed crumb and mesh particles.

6. A process as defined in claim 5, including periodic quality control laboratory testing the waste wash water for pollutants before being recycled in the rotating drum unit.

7. A process as defined in claim 1, including laboratory testing the crumb and mesh particles for contaminates before being used as an end product.

8. A process as defined in claim 1, wherein the crumb and mesh particles yielded from the third stage is a 20 minus mesh end product.

9. A process as defined in claim 1, including use of grinders, granulators, or cracker mills to further reduce the size of the crumb and mesh into a 20 to 200 minus mesh end product.

10. A process for separating the economic components of scrap rubber tires, including the steps of shredding the tires to yield particulate tire strips in a first stage;

conveying said particulate tire strips to a second stage;

rasping the tire strips yielding varying size crumb and mesh particles in the second stage while separating out steel and fiber materials from the tire strips wherein said steel and fiber are removed and used as an end product wherein the crumb and mesh particles are the end product;

conveying the crumb and mesh particles to a third stage;

washing the crumb and mesh particles in the third stage in a rotating drum unit while separating and retaining the waste wash water, contaminates, and freed particulates in a collection means and then drying said particulate crumb and mesh particles;

separating the particulates and contaminates from the waste wash water and properly disposing the particulates and contaminates;

filtering the waste wash water to remove pollutants yielding a processed water;

reusing the processed water in the third stage.

11. An apparatus for separating the economic components of scrap rubber tires comprising:

a shredder means for shredding the tires to yield particulate tire strips in a first stage;

a conveyor means for transferring the tire strips to a second stage;

a washer means for washing the tire strips in the second stage in a rotating drum unit while separating and retaining the waste wash water, contaminates, and freed particulates in a collection means and then drying said washed tire strips;

a filtration means for separating the particulates and contaminates from the waste wash water and properly disposing the particulates and contaminates;

a filtration means for removing pollutants from the waste wash water and yielding a processed water for reuse in the second stage;

a conveyor means for transferring the tire strips to a third stage;

a rasper means for rasping the tire strips in a third stage into crumb and mesh particles while removing the steel and fiber from the tire strips and the using the steel and fiber as by-product.

12. A apparatus as defined in claim 11, wherein the waste wash water is laboratory tested for pollutants before being recycled in the rotating drum unit in the second stage.

13. A apparatus as defined in claim 11, wherein said washer means includes a rotating drum with perforations that free particulates from the crumb and mesh particles when tumbling, rinsing the crumb and mesh particles, blow air drying of the crumb and mesh particles with hot air, a waste wash water holding tank capable of separating the freed particulates, contaminates and waste wash water including a water filtration system to recycle the resulting clean water in the washing means.

14. An apparatus as defined in claim 11, including a second washing means for the tires before the first stage in a rotating drum unit while separating and retaining the waste wash water, contaminates, and freed particulates in a collection means and then drying said washed tire strips.

15. An apparatus as defined in claim 14, wherein laboratory testing is performed on the waste wash water for pollutants before being recycled in the rotating drum unit.

16. An apparatus as defined in claim 11, including a washer means for the crumb and mesh particles after the third stage in a rotating drum unit while separating and retaining the waste wash water, contaminates, and freed particulates in a collection means and then drying said washed crumb and mesh particles.

17. An apparatus as defined in claim 16, wherein laboratory testing is performed on the waste wash water for pollutants before being recycled in the rotating drum unit.

18. An apparatus as defined in claim 11, wherein laboratory testing is performed on the crumb and mesh particles for contaminates before being used as an end product.

19. An apparatus as defined in claim 11, wherein the crumb and mesh particles yielded from the third stage is a 20 minus mesh end product.

20. An apparatus as defined in claim 11, including use of grinders, granulators, or cracker mills to further reduce the size of the crumb and mesh into a 20 to 200 minus mesh end product.

* * * * *